United States Patent Office 3,772,288
Patented Nov. 13, 1973

3,772,288
4,5-DIARYL-PYRIMIDIN-2(1H)-ONES
Goetz E. Hardtmann, Florham Park, and Faizulla G. Kathawala, West Orange, N.J., assignors to Sandoz-Wander, Inc., Hanover, N.J.
No Drawing. Continuation-in-part of abandoned application Ser. No. 878,572, Nov. 20, 1969. This application Nov. 9, 1970, Ser. No. 88,222
Int. Cl. C07d 51/38
U.S. Cl. 260—251 R                    19 Claims

ABSTRACT OF THE DISCLOSURE

The invention discloses compounds of the general class of 1-substituted-diaryl-pyrimidin-2(1H)-ones in which one of the aryl substituents is at the 4-position and the other aryl substituent is at the 5-position, e.g., 1-alkyl-4,5-diphenyl-pyrimidin-2(1H)-ones. Also disclosed are other 4,5-aryl and 5-aryl-pyrimidin-2(1H)-ones useful as intermediates and as pharmaceutical agents. The compounds exhibit a variety of biological effects and utility as pharmaceutical agents such as tranquilizers, anti-inflammatory and analgesic agents is also disclosed.

This application is a continuation-in-part of application Ser. No. 878,572, filed Nov. 20, 1969, now abandoned.

The present invention relates to 1-substituted-diaryl-substituted-pyrimidin-2(1H)-ones in which one of the aryl substituent is at the 4-position and the other aryl substituent is at the 5-position of the pyrimidin-2(1H)-one. The invention also relates to intermediates useful in preparing said compounds including the dihydro derivatives of said compounds and 1-substituted-5-phenyl-pyrimidin-2(1H)-ones. The invention also relates to compositions and methods for utilizing compounds of said type and their biological activities.

In accordance with one aspect of the invention there is provided compounds of the General Formula I:

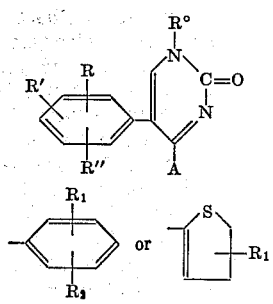

(I)

wherein A is

R° is lower alkyl of 1 to 5 carbon atoms;
each of R and R'' is, independently, hydrogen, halo of atomic weight of from 18 to 80, lower alkyl of 1 to 3 carbon atoms or lower alkoxy of 1 to 3 carbon atoms;
R' is hydrogen, lower alkoxy of 1 to 3 carbon atoms or trifluoromethyl; provided that R and R'' are hydrogen when R' is trifluoromethyl;
$R_1$ is hydrogen, halo of atomic weight of from 18 to 80, lower alkyl of 1 to 3 carbon atoms or lower alkoxy of 1 to 3 carbon atoms; and
$R_2$ is hydrogen, halo of atomic weight of from 18 to 80, lower alkyl of 1 to 3 carbon atoms, lower alkoxy of 1 to 3 carbon atoms or trifluoromethyl, provided that $R_1$ is hydrogen when $R_2$ is trifluoromethyl.

The compounds of the invention are preferably prepared by Procedure A involving subjecting a compound of Formula II:

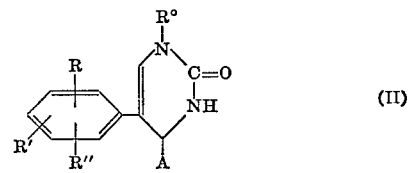

(II)

wherein R°, R, R', R'' and A are as defined, to oxidation.

An alternate process for preparing the compounds of Formula I referred to herein as Procedure B involves reacting a compound which may be represented herein by the Formula III:

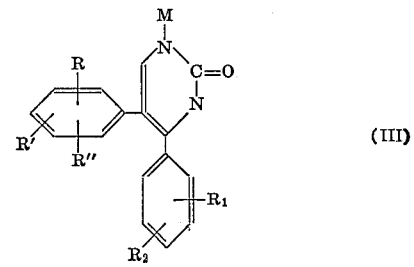

(III)

wherein R, R', R'', $R_1$ and $R_2$ are as defined and M represents an alkali metal, preferably sodium or potassium, with an alkyl halide of Formula IV:

X—R°         (IV)

wherein X is halo of atomic weight of from 35 to 127, preferably iodo, and R° is as above defined.

The preparation of compounds of Formula I by Procedure A is conveniently carried out at temperatures in the range of from 20° C. to 150° C., preferably 40° C. to 100° C. Suitable oxidizing agents are those of conventional types, preferably an alkali metal permanganate such as sodium or potassium permanganate, or manganese dioxide of the well known "active" or oxidizing grades. The particularly preferred oxidizing agent found to reduce side reactions is manganese dioxide. The oxidation is carried out in a suitable inert liquid medium which is conveniently an organic solvent of conventional type, preferably dioxane, acetone, benzene, xylene and the like. The product Compounds I may be isolated from the Procedure A reaction by working up by conventional procedure.

The preparation of Compounds I by Procedure B involving the reaction of the 1-metallo-derivative or salt of the Formula III with an organic halide of Formula IV is conveniently carried out at temperatures in the range of from 10° C. up to about 100° C., preferably at about room temperature (20° C.) or at elevated temperature up to 80° C. The reaction is carried out in an inert solvent which may be any of several conventional types such that the solvent is conveniently the solvent employed in preparation of the starting metallo Compound III. The reaction product of Formula I may be isolated from the reaction mixture of Procedure B by working up by conventional procedures.

It will be noted thta the 1-metallo salts of Formula III employed in Procedure B are preferably prepared directly from compounds which may be variously named because of their tautomeric character but which will be readily recognized by those skilled in the art by the identification of such compounds herein as 5,6-diphenyl pyrimidin-2-ols. Such preparation of Compounds III involves treating a 5,6-diphenyl-pyrimidin-2-ol in an organic solvents with reagents commonly employed for preparing alkali metal salts and in a conventional manner for preparation of such salts. Said salt-forming reagents include by way of illustration sodium hydride and alkali metal alkoxides such as sodium methoxide, sodium ethoxide, potassium methoxide and potassium ethoxide. The organic solvent employed may be any of several conventional inert organic solvents and desirably a solvent suitable for both the salt preparation and use in the reaction of Procedure B. Such solvents include by way of illustration tetrahydrofuran, dimethylacetamide and dioxane, preferably tetrahydrofuran. The lower alkanols may be employed as co-solvents in a known manner in preparing Compounds III and removed if desired prior to preparation of Compounds I. The preparation of the 1-metallo-4,5-diphenyl compounds of Formula III from the 5,6-diphenyl-pyrimidin-2-ols is possible because the latter react in organic solvents in a manner which favors the resulting preparation of the compounds which are 1-substituted-4,5-diphenyl-pyrimidin-2(1H)-ones.

The compounds of Formula II employed in Procedure A are preferably prepared by a Step A-1 involving reacting a compound of Formula V:

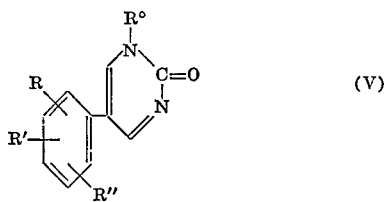

wherein R°, R, R' and R" are as defined, with an aryl lithium compound or an arylmagnesium halide of the General Formula VI:

(VI)-A   A—Li   or   (VI)-B   A—MgX wherein A is as above defined, and X is a Grignard halogen, e.g., chloro or bromo, preferably chloro, the preferred Compound VI being of Formula VI-A, followed by hydrolysis in a conventional manner to obtain the compounds of Formula II.

The preparation of Compounds II by Step A-1 may be carried out in the presence of an inert organic solvent and at temperatures in the range of 0° C. to 60° C., preferably 15° C. to 45° C., followed by hydrolysis in the known manner. Preferred solvents are those customarily employed in Grignard reactions, more preferably the ethers including, by way of illustration, tetrahydrofuran, dioxane, dimethoxyethane and diethyl ether. The particularly preferred compound of Formula IV for use in Step A-1 is an aryl lithium compound of Formula VI-A. The product Compounds II from Step A-1 may be isolated for use by working up by conventional procedures.

The compounds of Formula V employed as starting material in Step A-1 are preferably prepared by a new process A-1-a involving reacting of a 3-dialkylamine-2-phenyl-acrolein of the Formula VII:

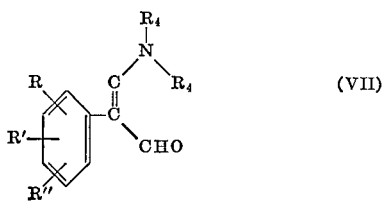

in which R, R' and R" are as above defined and $R_4$ is alkyl, preferably straight chain lower alkyl, of 1 to 3 carbon atoms, with an N—R°-substituted urea of the Formula VIII:

in the presence of an acid as catalyst and in an inert organic solvent.

The preparation of Compound V by process A-1-a involving the reaction of a Compound VII with a Compound VIII is suitably carried out at elevated temperatures in the range of 60° C. to 150° C., preferably 80° C. to 120° C., in the presence of an acid catalyst and in an inert organic solvent. Acids suitable for use in the reaction are the strong acids which may be an inorganic acid such as sulfuric acid or an organic acid such as an aryl sulfuric acid or alkyl sulfonic acid, e.g., p-toluenesulfonic acid and methanesulfonic acid, preferably p-toluenesulfonic acid as commercially suitable in monohydrate form. The solvent for the reaction may be any of several conventional organic solvents inert in the reaction, preferably a hydrocarbon solvent of the aromatic type such as benzene and toluene, more preferably toluene. The reaction product of Formula V may be isolated from the reaction of Step 1-a by working up by conventional procedures.

The compounds of Formula VII employed as starting material in Step A-1-a may be prepared according to procedures described in the literature, e.g., by Z. Arnold, Coll. Czech. Chem. Comm. 26, 3051 (1961).

The compounds of Formula V may also be alternately prepared, for example, by reacting a phenyl malondialdehyde within an N—R°-substituted urea of Formula VIII at elevated temperatures as exemplified herein in Example 5 and analogously to procedures known in the literature, e.g., Helv. Chim. Acta 10, 299 (1927). The phenyl malondialdehydes are either known or may be prepared from known materials by procedures disclosed in the literature and/or as exemplified herein in Step A of Example 5.

The 5,6-diphenyl-pyrimidin-2-ols employed as starting material in preparation of the 1-metallo intermediate of Formula III are either known or may be prepared from known materials by established procedures. A preferred procedure is illustrated in Step A of Example 6 and involves the reaction of a 2,3-diphenyl-3-hydroxyacrolein with urea in an inert solvent at elevated temperatures, analogously to the preparation described, for example, by F. Eiden and S. S. Nagar, Arch. Pharm. 297 (6), 367–79 (1964). The 2,3-diphenyl-3-hydroxyacroleins are either known or produced by established procedures, for example, as illustrated herein in Example 6A.

The 1-substituted-4,5-diaryl-pyrimidin-2(1H)-ones of Formula I are useful as anti-inflammatory agents as indicated, for example, by the Carrageenan-induced edema test on rats on oral administration and/or by the adjuvant arthritis test in rats using Freund's adjuvant. The compounds of Formula I are also useful for relieving pain in animals and thus also as analgesics, as indicated, for example, by application of pressure to the yeast-inflamed foot of the rat on oral administration. The dosage of Compounds I will, of course, vary depending upon known factors such as the compound used and the mode of administration. However, for the above-mentioned usages, satisfactory results in general are obtained when administered at a daily dosage of 2 milligrams to 150 milligrams per kilogram of body weight, preferably given in divided doses 2 to 4 times a day, or in sustained release form. For most mammals, the administration of from 120 to 2000 milligrams of a compound of Formula I per day provides satisfactory results and dosage forms suitable for internal administration comprise from about 30 to 1000 milligrams of the compound in admixture with a solid or liquid pharmaceutical carrier or diluent.

The compounds of Formula I also exhibit an effect on the Central Nervous System and may be used as minor tranquilizing agents as indicated by the combined result of showing mixed Central Nervous System activity in behavior tests in mice and an antagonism of amphetamine in mice. Such result may be obtained in animals at the daily doses given above. At least certain of said compounds of Formula I may exhibit their central nervous system activity in one or more additional animal tests, for example, by inhibiting chemically induced convulsions in mice.

The compounds of both Formula I are also useful as mild hypotensive agents as indicated by a lowering of blood pressure on intravenous administration to the anesthetized dog, and may be administered for such purposes at daily doses previously given for the compounds of Formula I.

The intermediate compounds of Formula II also exhibit pharmacological activity in animals and, in particular, are useful as minor tranquilizing agents as indicated by the combined result of showing a central nervous system depressant activity in behavior tests in mice and an antagonism of amphetamine in mice. Such compounds of Formula II may be administered to obtain such result in a similar manner and at the daily dosages indicated for the use of the compounds of Formula I. The compounds Formula II distinguish from the compounds of Formula I in that said Compounds II do not exhibit any significant anti-inflammatory activity.

The intermediate compounds of the Formula V are also useful as anti-inflammatory agents as indicated by the Carrageenan-induced edema test and/or the adjuvant arthritis test in rats. For such use satisfactory results in general are obtained on the administration of a daily dose of from 3 to 180 milligrams per kilogram of animal body weight. For most mammals, the daily administration of from 180 to 2400 milligrams of a compound of the Formula V provides satisfactory results and dosage forms comprise from about 45 to 1200 milligrams of the compound in admixture with a solid or liquid pharmaceutical carrier.

For the above uses, the pharmaceutically useful compounds provided by the invention may be formulated in a conventional manner to contain an effective dose of one or more of said compounds as active ingredient together with an inert pharmaceutically acceptable carrier adapted to provide a composition suitable for either oral administration or for administration parenterally in the form of an injectable solution or suspension. In general, the preferred compositions are those adapted for oral administration and conventional forms for this purpose are suitable, such as tablets, dispersible powders, granules, capsules, syrups, elixirs and the like. Such compositions for oral administration may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| | Weight (mg.) |
|---|---|
| 1-isopropyl-4,5-diphenyl-pyrimidin-2(1H)-ones | 50 |
| Tragacanth | 10 |
| Lactose | 197.5 |
| Corn starch | 25 |
| Talcum | 15 |
| Magnesium stearate | 2.5 |

The preferred compounds of Formula I include those in which A is unsubstituted phenyl and those in which R is isopropyl, more preferably 1-isopropyl-4,5-diphenyl-pyrimidin-2(1H)-one. Preferred among the compounds of Formula II from the standpoint of their pharmaceutical activity is 1-methyl-4,5-diphenyl-3,4-dihydro-pyrimidin-2(1H)-one.

The following examples show representative compounds encompassed within the scope of this invention and the manner in which such compounds are prepared. However, it is to be understood that the examples are for purposes of illustration only.

EXAMPLE 1

1-methyl-4,5-diphenyl-3,4-dihydro-pyrimidin-2(1H)-one

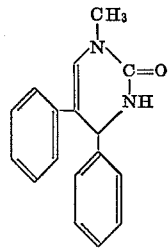

Step A: Preparation of 1-methyl-5-phenyl-pyrimidin-2(1H)-one. A mixed system of 50 g. of 3-dimethylamino-2-phenyl-acrolein, 50 g. of N-methylurea, 50 g. of p-toluenesulfonic acid monohydrate and 600 ml. of toluene is refluxed for 16 hours with stirring. The resulting mixture is cooled, diluted with 300 ml. of toluene, washed with 500 ml. of 2 N sodium hydroxide solution and twice each with 150 ml. of conc. sodium bisulfide solution. The organic phase is dried and evaporated in vacuo to obtain an oil which is combined with a residue obtained on methylene chloride extraction and evaporation of the aqueous alkaline layer from the previous extraction. The resulting oil is crystallized from methanol/pentane to obtain 1-methyl-5-phenyl-pyrimidin-2(1H)-one, M.P. 187–190° C.

Step B: Preparation of 1-methyl-4,5-diphenyl-3,4-dihydropyrimidin-2(1H)-one. To a mixture of 19 g. of 1-methyl-5-phenyl-pyrimidin-2(1H)-one and 500 ml. of tetrahydrofuran is added dropwise with stirring 110 ml of a 2.2 N solution of phenyllithium. The mixture is stirred for 30 minutes at room temperature, poured into ice water, evaporated in vacuo to remove solvent and extracted 2 times with chloroform. The combined organic phases are dried and evaporated in vacuo to obtain an oil which is crystallized from methylene chloride/ethyl acetate/diether ether to obtain 1-methyl-4,5-diphenyl-3,4-dihydropyrimidin-2(1H)-one, M.P. 169–173° C.

EXAMPLE 2

Following the procedures of Example 1 the following are obtained:
(a) 1-ethyl-5-phenyl-pyrimidin-2(1H)-one, M.P. 168–172° C. on crystallization from ethyl acetate/diethyl ether and 1-ethyl-4,5-diphenyl - 3,4 - dihydropyrimidin-2(1H)-one, M.P. 159–161° C. on crystallization from methylene chloride/diethyl ether/pentane.

(b) 1 - isopropyl-5-phenyl-pyrimidin-2(1H)-one, M.P. 120–122° C. on crystallization from ethyl acetate/diethyl ether and 1-isopropyl-4,5-diphenyl-3,4-dihydropyrimidin-2(1H)-one, M.P. 127–131° C. on crystallization from methylene chloride/diethyl ether/pentane.

(c) 1 - isopropyl-5-(4-chlorophenyl)-pyrimidin-2(1H)-one, M.P. 178–182° C. on crystallization from diethyl ether/pentane and 1-isopropyl-4-phenyl-5-(4-chlorophenyl)-3,4-dihydro-pyrimidin-2(1H)-one, M.P. 134–138° C. on crystallization from diethyl ether/pentane.

(d) 1 - isopropyl-5-(3-methylphenyl)-pyrimidin-2(1H)-one, M.P. 118–121° C. on crystallization from methylene chloride/diethyl ether and 1-isopropyl - 4 - phenyl-5-(3-methylphenyl) - 3,4 - dihydro-pyrimidin-2(1H)-one, M.P. 139–143° C. on crystallization from diethyl ether/pentane.

(e) 1 - isopropyl - 5 - (4 - methoxyphenyl)-pyrimidin-2(1H)-one and 1-isopropyl-4-phenyl-5-(4-methoxyphenyl)-3,4-dihydro-pyrimidin-2(1H)-one, M.P. 115–120° C. from ethyl acetate/pentane.

(f) 1 - methyl - 5 - (3,4 - dimethoxyphenyl)pyrimidin-2(1H)-one, M.P. 213–216° C. from methylene chloride/ethanol and 1-methyl-4-phenyl-5-(3,4-dimethoxyphenyl)-3,4-dihydro-pyrimidin-2(1H)-one.

(g) 1 - isopropyl - 4 - (4-chlorophenyl)-5-phenyl-3,4-dihydropyrimidin-2(1H)-one, M.P. 174–176° C. from methylene chloride/pentane.

(h) 1-isopropyl - 4 - (2-thienyl)-5-phenyl-3,4-dihydro-pyrimidin-2(1H)-one, M.P. 170–172° C. from methanol/diethyl ether.

EXAMPLE 3

1-methyl-4,5-diphenyl-pyrimidin-2(1H)-one

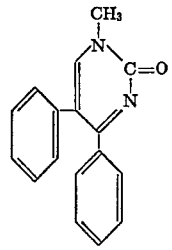

A mixture of 15 g. of 1-methyl-4,5-diphenyl-3,4-dihydropyrimidin-2(1H)-one, 10 g. of purified manganese dioxide and 250 ml. of benzene is refluxed with stirring for 16 hours. An additional 5 g. of manganese dioxide is added and refluxing continued for 7 hours. The resulting mixture is filtered and evaporated in vacuo to obtain an oil which is crystallized from methanol/pentane and recrystallized from acetone/pentane to obtain 1-methyl-4,5-diphenyl-pyrimidin-2(1H)-one, M.P. 159–162° C.

EXAMPLE 4

Following the procedure of Example 3 there is obtained:

(a) 1-ethyl - 4,5 - diphenyl-pyrimidin-2(1H)-one, M.P. 120–123° C. (crystallization from methylene chloride/diethyl ether/pentane).

(b) 1-isopropyl - 4,5 - diphenyl-pyrimidin-2(1H)-one, M.P. 138–140° C. (crystallization from ethyl acetate/pentane).

(c) 1-isopropyl - 4 - phenyl-5-(4-chlorophenyl)-pyrimidin-2(1H)-one, M.P. 213–215° C. on crystallization from methylene chloride/pentane.

(d) 1-isopropyl - 4 - phenyl-5-(3-methylphenyl)-pyrimidin-2(1H)-one, M.P. 183–185° C. from methylene chloride/diethyl ether.

(e) 1 - isopropyl - 4 - phenyl-5-(4-memthoxyphenyl)-pyrimidin-2(1H)-one, M.P. 155–158° C. from methylene chloride/diethyl ether.

(f) 1-methyl - 4 - phenyl-5-(3,4-dimethoxyphenyl)-pyrimidin-2(1H)-one.

(g) 1-isopropyl-4-(4-chlorophenyl) - 5 - phenyl-pyrimidin-2(1H)-one, M.P. 204–208° C. from methylene chloride/diethyl ether.

(h) 1 - isopropyl - 4 - (2-thienyl)-5-phenyl-pyrimidin-2(1H)-one, M.P. 163–166° C. from methylene chloride/pentane.

EXAMPLE 5

1-methyl-5-phenyl-pyrimidin-2(1H)-one
(alternate preparation)

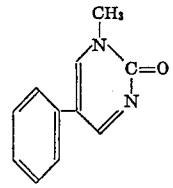

Step A: Preparation of phenyl malondialdehyde. A mixture of 10 g. of oxalic acid, 400 ml. of water and 20 g. of 3-dimethylamino-2-phenyl-acrolein is steam distilled until 1.5 liters of distillate is collected. A solution of 20 g. of cupric acetate in 200 ml. of water is added to the distillate and the resulting mixture filtered, washed with water suspended in 2 N hydrochloric acid solution, filtered, washed with water, dried, dissolved in diethyl ether, washed first with 10% sodium bicarbonate solution and then with saturated sodium chloride solution, dried and evaporated in vacuo to obtain a residue which is crystallized from diethyl ether/pentane to obtain phenyl malondialdehyde, M.P. 91–94° C.

Step B: Preparation of 1-methyl-5-phenyl-pyrimidin-2(1H)-one. A mixture of 1.4 g. of phenyl malondialdehyde and 750 mg. of N-methylurea is heated at 150° C. for 2 hours on an oil bath. The resulting residue is dissolved in methylene chloride, washed 3 times with water, dried and evaporated in vacuo. The resulting residue is dissolved in methylene chloride, filtered over charcoal and crystallized by addition of ethyl acetate to obtain 1-methyl-5-phenyl-pyrimidin-2(1H)-one, M.P. 189–191° C.

EXAMPLE 6

1-methyl-4,5-diphenyl-pyrimidin-2(1H)-one
(alternate preparation)

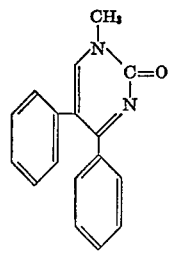

Step A: Preparation of 5,6-diphenyl-pyrimidin-2-ol. A mixture of 2 g. of 2,3-diphenyl-3-hydroxyacrolein and 2 g. of urea in 5 ml. of dimethylacetamide is heated at 150–160° C. for one hour. The solvent is removed by evaporation in vacuo, the residue dissolved in methylene chloride and extracted 3 times with water. The resulting solution is dried, evaporated in vacuo and the residue titurated with diethyl ether, insoluble material filtered off and crystallized from ethylene chloride/diethyl ether to obtain 5,6-diphenyl-pyrimidin-2-ol, M.P. 223–225° C.

Step B: Preparation of 1-methyl-4,5-diphenyl-pyrimidin-2(1H)-one. To a solution of 500 mg. of 5,6-diphenyl-pyrimidin-2-ol in 20 ml. of tetrahydrofuran and 5 ml. of methanol is added 120 mg. of sodium methoxide followed by stirring for 5 minutes at room temperature. There is then added 1 ml. of methyl iodide with continued stirring for an additional 15 minutes at room temperature. The resulting mixture is evaporated in vacuo, the residue dissolved in methylene chloride, washed 2 times with water, dried and evaporated in vacuo. The residue is crystallized from ethyl acetate/petroleum ether and then from ethyl acetate/diethyl ether to obtain 1-methyl-4,5-diphenylpyrimidin-2(1H)-one, M.P. 159–162° C.

EXAMPLE 6A

Preparation of 2,3-diphenyl-3-hydroxyacrolein use in Step A of Example 6

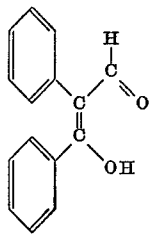

To a cooled (ice bath) mixture formed by adding 15 g. of sodium to 150 ml. of absolute ethanol is added dropwise with stirring 40 g. of ethyl formate. The resulting mixture is allowed to stand for 3 hours at 0–5° C. and there is then added thereto portionwise 100 g. of deoxybenzoin. The resulting mixture is stirred for 2 hours at 0–5° C. and then allowed to stand for 3½ days at 0–5° C. The mixture is then allowed to stand for 24 hours at room temperature and then poured onto ice, filtered, acidified, extracted 3 times with methylene chloride, dried and evaporated in vacuo to obtain an oil which is treated with diethyl ether/pertoleum ether to obtain 2,3-diphenyl-3-hydroxyacrolein, M.P. 108–111° C.

What is claimed is:

1. A compound of the formula:

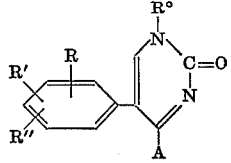

wherein A is:

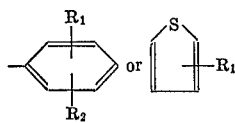

$R^°$ is alkyl of 1 to 5 carbon atoms;
each or R and R" is, independently, hydrogen, halo of atomic weight of from 18 to 80, alkyl of 1 to 3 carbon atoms or alkoxy of 1 to 3 carbon atoms;
R' is hydrogen, alkoxy of 1 to 3 carbon atoms or trifluoromethyl; provided that R and R" are hydrogen when R' is trifluoromethyl;
$R_1$ is hydrogen, halo or atomic weight of from 18 to 80, alkyl of 1 to 3 carbon atoms or alkoxy of 1 to 3 carbon atoms; and
$R_2$ is hydrogen, halo of atomic weight of from 18 to 80, alkyl of 1 to 3 carbon atoms, alkoxy of 1 to 3 carbon atoms or trifluoromethyl; provided that $R_1$ is hydrogen when $R_2$ is trifluoromethyl.

2. A compound of claim 1 in which A is:

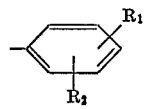

3. A compound of claim 2 in which each of R, R', R", $R_1$ and $R_2$ is hydrogen.
4. The compound of claim 3 which is 1-methyl-4,5-diphenylpyrimidin-2(1H)-one.
5. The compound of claim 3 which is 1-ethyl-4,5-diphenylpyrimidin-2(1H)-one.
6. The compound of claim 3 which is 1-isopropyl-4,5-diphenyl-pyrimidin-2(1H)-one.
7. A compound of claim 2 in which each of $R_1$ and $R_2$ is hydrogen.
8. A compound of claim 1 in which A is:

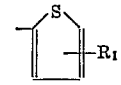

9. A compound of claim 8 in which $R_1$ is hydrogen.
10. A compound of the formula:

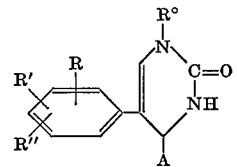

in which A, $R^°$, $R_1$, R' and R" are as defined in claim 1.
11. A compound of claim 10 in which A is

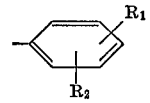

12. A compound of claim 11 in which each of $R_1$ and $R_2$ is hydrogen.
13. A compound of claim 12 in which each of R' and R" are hydrogen.
14. A compound of claim 13 in which R is hydrogen.
15. The compound of claim 14 in which $R^°$ is methyl.
16. A compound of claim 13 in which R is chloro.
17. A compound of claim 13 in which R is methyl.
18. A compound of claim 13 in which R is methoxy.
19. A compound of claim 11 in which A is 4-chlorophenyl and each of R, R' and R" is hydrogen.

References Cited

Mantegazza et al.: Arch. Intern. Pharmacodynamie 95, 123–52 (1953).
Eiden et al.: C.A. 61, 14560f (1964).

ALEX MAZEL, Primary Examiner
R. V. RUSH, Assistant Examiner

U.S. Cl. X.R.
260—570.5 C; 424—251